United States Patent [19]
Brach et al.

[11] Patent Number: 5,335,802
[45] Date of Patent: Aug. 9, 1994

[54] PLASTIC CLOSURE FOR A CONTAINER

[75] Inventors: Ulrich Brach, Traben-Trarbach; Klaus Thanisch, Bullay, both of Fed. Rep. of Germany

[73] Assignee: Creanova AG, Baar, Switzerland

[21] Appl. No.: 942,813

[22] Filed: Sep. 10, 1992

[30] Foreign Application Priority Data

Sep. 10, 1991 [CH] Switzerland ............... 2658/91-2

[51] Int. Cl.⁵ .................................. B65D 51/18
[52] U.S. Cl. ............................ 215/235; 215/253; 220/339
[58] Field of Search ............ 215/235, 237, 253; 220/339, 266, 268, 276

[56] References Cited

U.S. PATENT DOCUMENTS

| | | | |
|---|---|---|---|
| 4,403,712 | 9/1983 | Wiesinger | 220/339 |
| 4,696,408 | 9/1987 | Dubach | 215/237 |
| 4,793,501 | 12/1988 | Beck | 215/235 |
| 4,911,324 | 3/1990 | Dubach | 220/339 |
| 5,007,555 | 4/1991 | Beck | 220/339 |
| 5,115,931 | 5/1992 | Dubach | 215/235 |

FOREIGN PATENT DOCUMENTS

| | | |
|---|---|---|
| 0011822 | 6/1980 | European Pat. Off. . |
| 0056469 | 7/1982 | European Pat. Off. . |
| 0309396 | 3/1989 | European Pat. Off. . |
| 3909385 | 3/1990 | Fed. Rep. of Germany . |
| 2309425 | 11/1976 | France . |

OTHER PUBLICATIONS

International Search Report by EPO in Swiss Application 2658/91 (Apr. 24, 1992).

Primary Examiner—Allan N. Shoap
Assistant Examiner—Nova Stucker
Attorney, Agent, or Firm—Rothwell, Figg, Ernst & Kurz

[57] ABSTRACT

The closure (1) consists of a tubular base portion (2) and a cap (3). Considered in the direction of the axis (17) of the base portion (2), in the closed position the outer contour of the cap (3) is within the interior contour of the base portion (2). Cap and base portion are connected to each other in a single unit by a snap hinge and injection molded in a closed position. Extending from the snap hinge, cap and base portion are additionally connected together by a safety strap (40), which is to safeguard against unintentional premature opening of the closure (tamper evidence). The closure enables a marked productivity increase during manufacture.

17 Claims, 4 Drawing Sheets

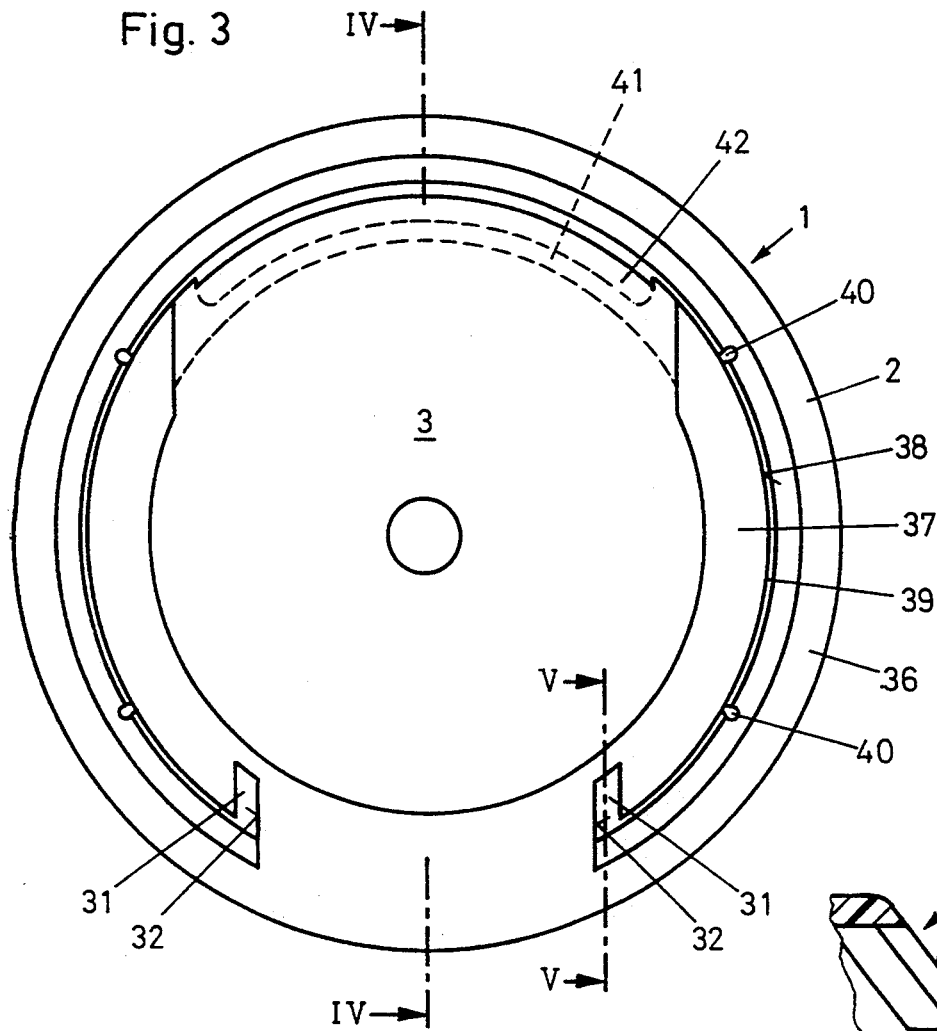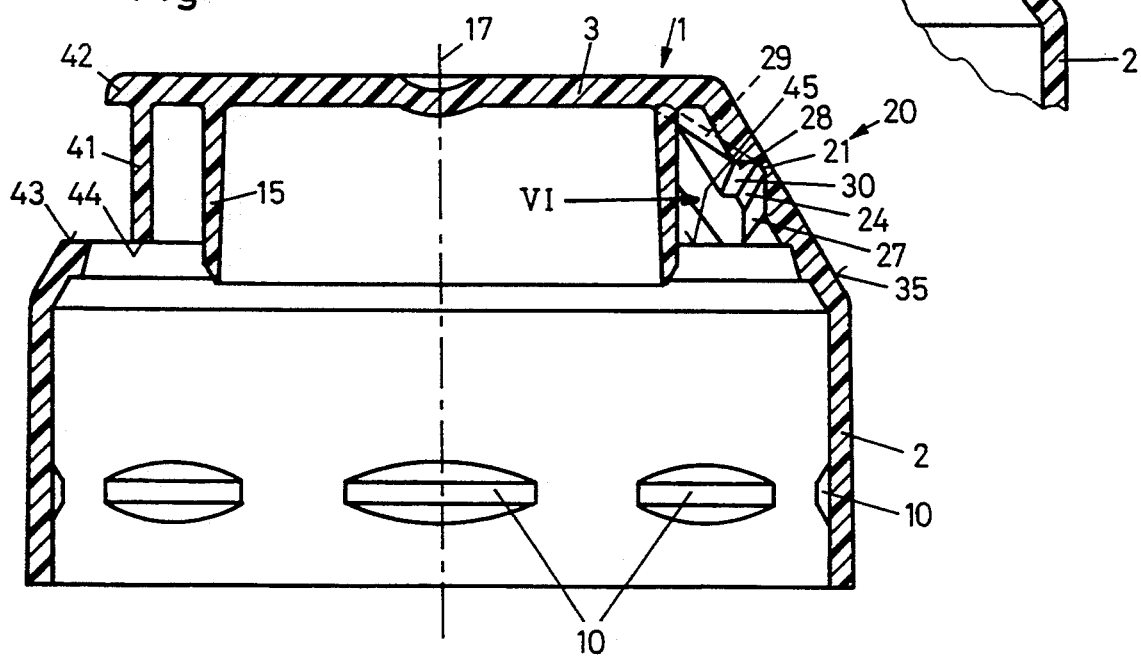

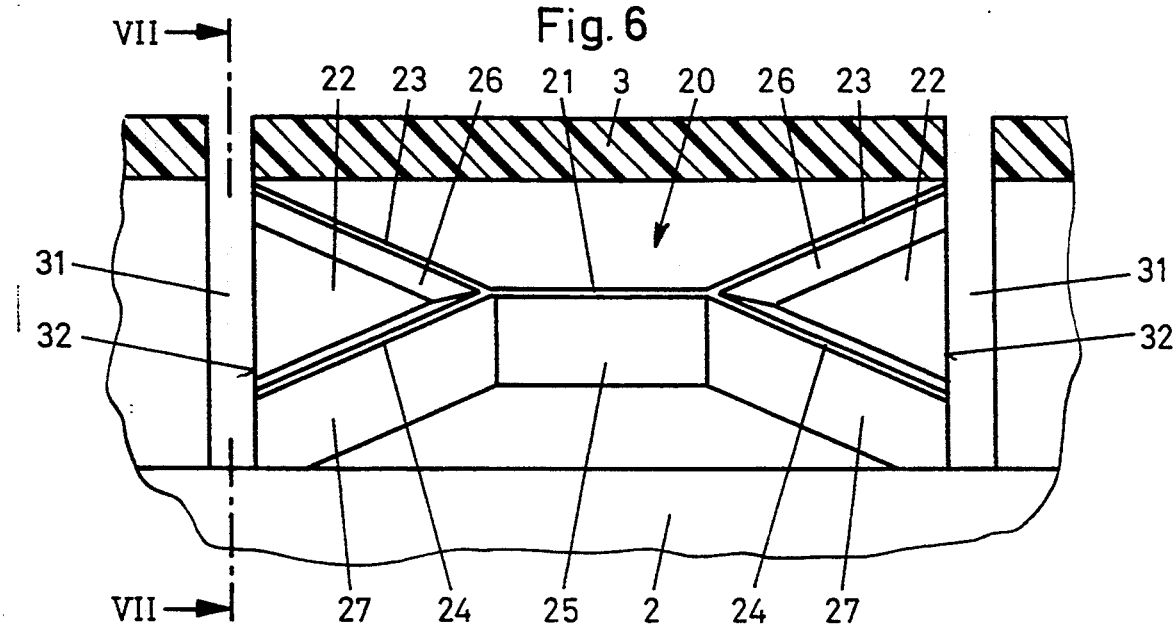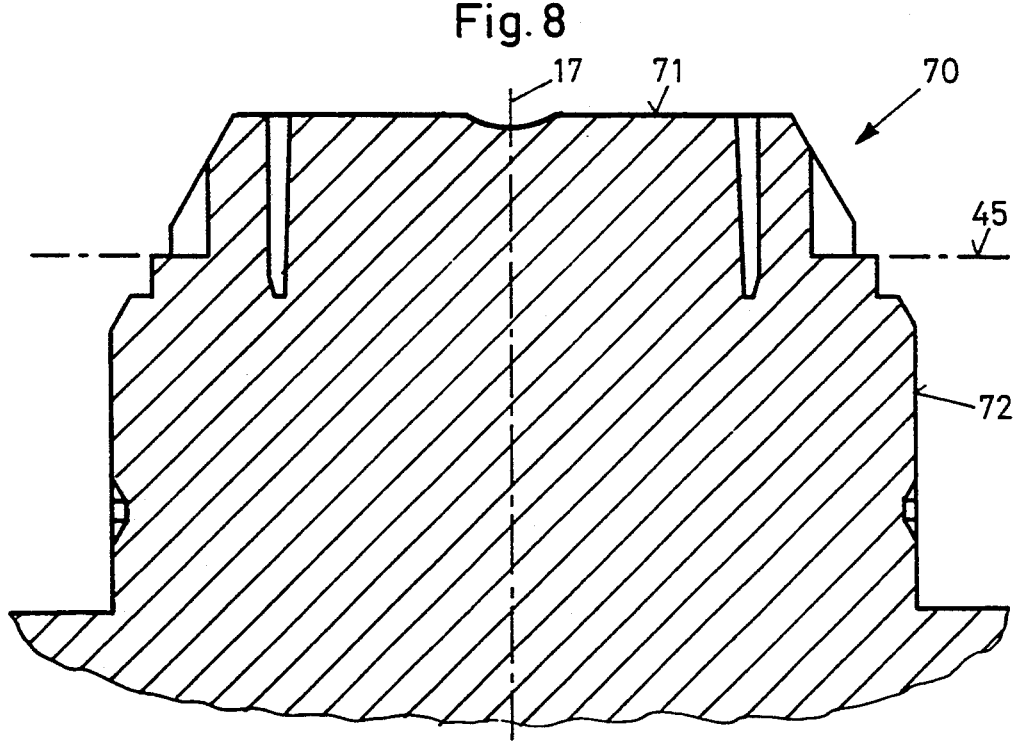

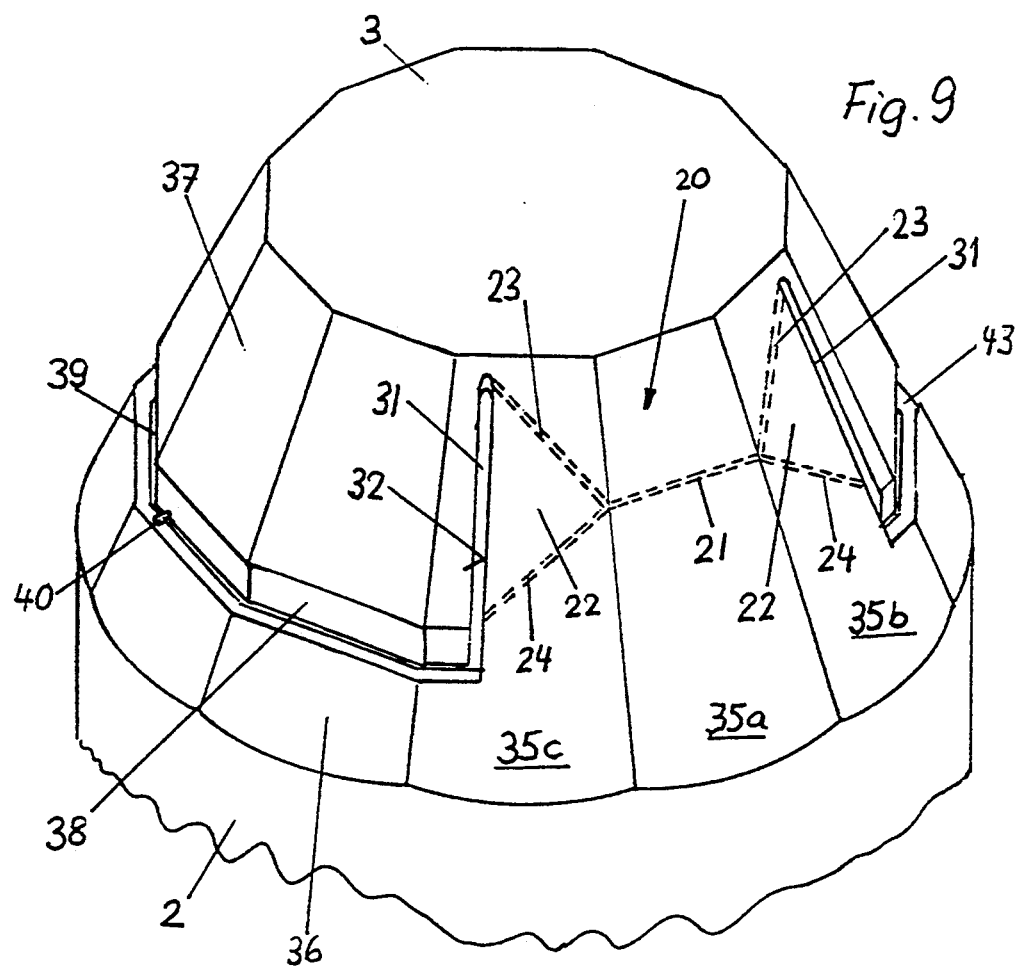
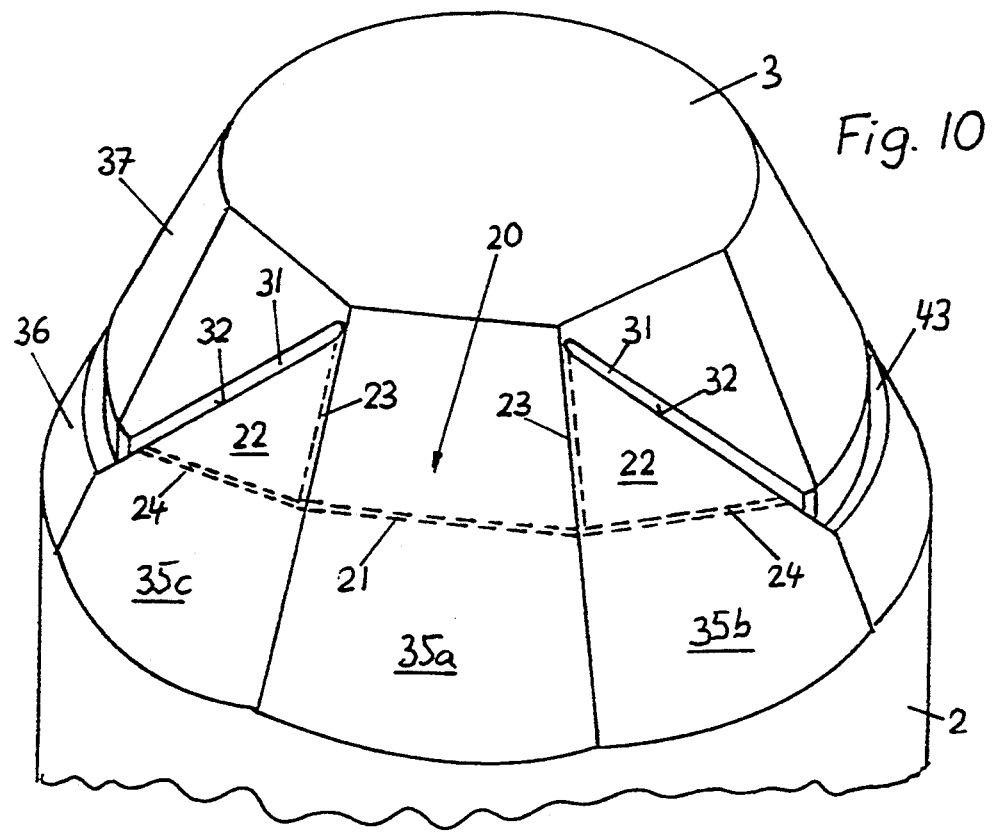

PLASTIC CLOSURE FOR A CONTAINER

BACKGROUND OF THE INVENTION

The invention relates to a closure for a container such as a cap for a bottle or the like.

Bottle stoppers are injection molded by many various methods. EP Patent No. 0 056 469 describes single-piece stoppers with snap hinges that have proven to be very reliable. A plastic closure of similar construction, but that does not have a snap hinge, is known from French patent No. FR-2 309 425. The present invention is based on the technical problem of making a generic stopper with a snap hinge, that is both less expensive to produce and safe and easy to use. This technical problem is solved by the present invention as will be described below.

The known closures of the kind referred to above are injection molded in a position open to approximately 180°. The opening to a complete 180° is necessary in order to achieve a simple mold opening without transverse stresses. The inverse shapes of the interior contours of the cap and base portions are situated side by side in one half of the injection mold. The hinges must be chosen so that they allow for an opening of around 180°, an opening angle that afterwards is not normally in use at all.

SUMMARY OF THE INVENTION

The closure according to the present invention makes possible a process with which, in contrast to the conventional method of manufacture, the closure can be manufactured in a closed position in the injection molding process. This results in a number of remarkable advantages.

The cross-sectional area of the injection mold parts is reduced to somewhat less than half, so that double as many closures can be produced on the same injection mold press per cycle than with conventional processes and conventional tools. Because the closures are already closed after the injection molding, the isolated closing operation required for conventional closures is no longer required. For the foregoing reasons the closures according to the invention can be produced at a significantly lower cost.

Because the closure is injection molded in a closed position, it can quite easily be made tamper proof, i.e. secure against unintentional premature opening, by attaching safety tabs to the snap hinge between the top and the lower portion. These safety tabs contribute to filling the die cavity during injection molding.

In contrast to conventional closures, it is not necessary in this process for the cap to swivel 180° from the closed position relative to the base portion.

BRIEF DESCRIPTION OF THE DRAWINGS

The advantages of the present invention will become more fully understood from the following description in conjunction with the attached drawings, in which:

FIG. 2 and FIG. 3 are sectional views in the direction of the arrows II and III in FIG. 1 respectively;

FIG. 4 and FIG. 5 are sectional views along lines IV—IV and V—V in FIG. 3 respectively;

FIG. 6 is an enlarged view in the direction of arrow VI in FIG. 4;

FIG. 7 is a sectional view along lines VII—VII in FIG. 6;

FIG. 8 is a schematic axial view through a portion of an injection mold part; and FIG. 9 and FIG. 10 are plan views of two alternate embodiments of the invention.

DESCRIPTION OF THE PREFERRED EMBODIMENTS

Figure 1:
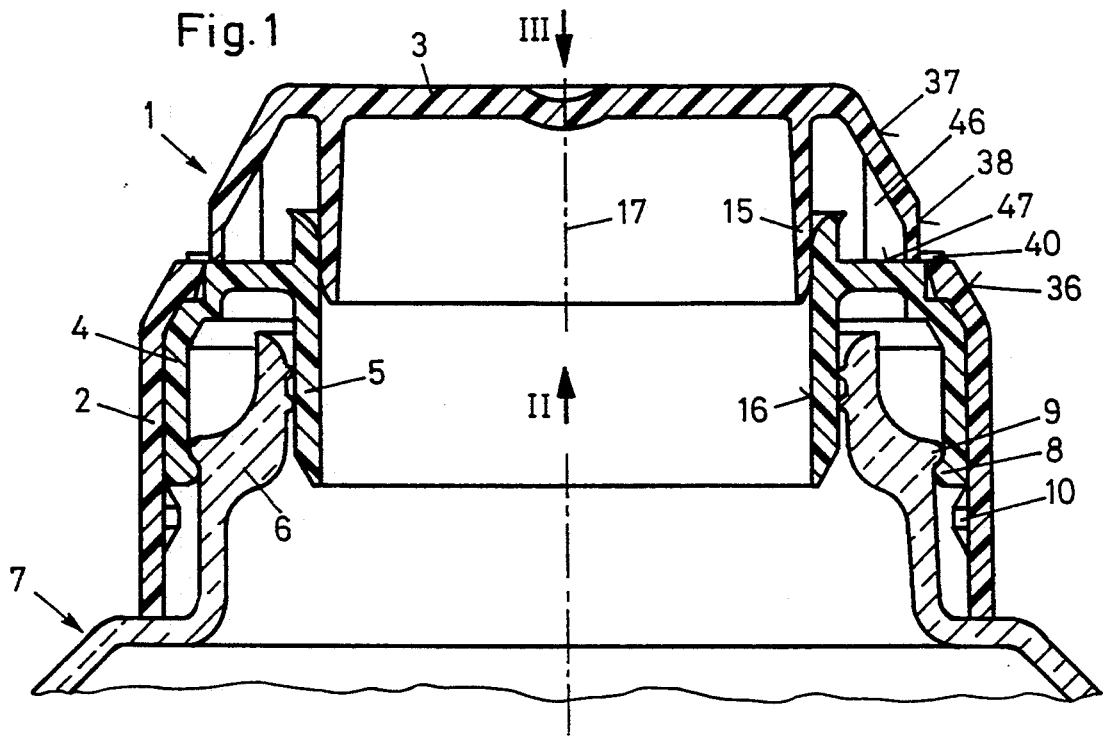
FIG. 1 is an axial view through a bottle closure according to the present invention.

Bottle closure 1 as shown in FIG. 1 is a single piece of plastic, e.g. of polypropylene, injection molded and consisting of a pipe shaped base portion 2 and a cap portion 3. Insert 4 is snapped into base portion 2, which with cylindrical insert 5 is inserted as a seal into the cylindrical neck 6 of bottle 7. By means of a circular ring 8, insert 4 is snapped over rim 9 of the bottle neck 6. Clamping rim 10 of base portion 2 holds the insert 4 in the base portion 2. In the embodiment presented here a circular cylindrical, tubular insert 15 of cap 3 seals against a cylindrical interior surface 16 of insert 4. Surface 16 and insert are coaxial to axis 17 of the tubular base portion 2.

Figure 2:
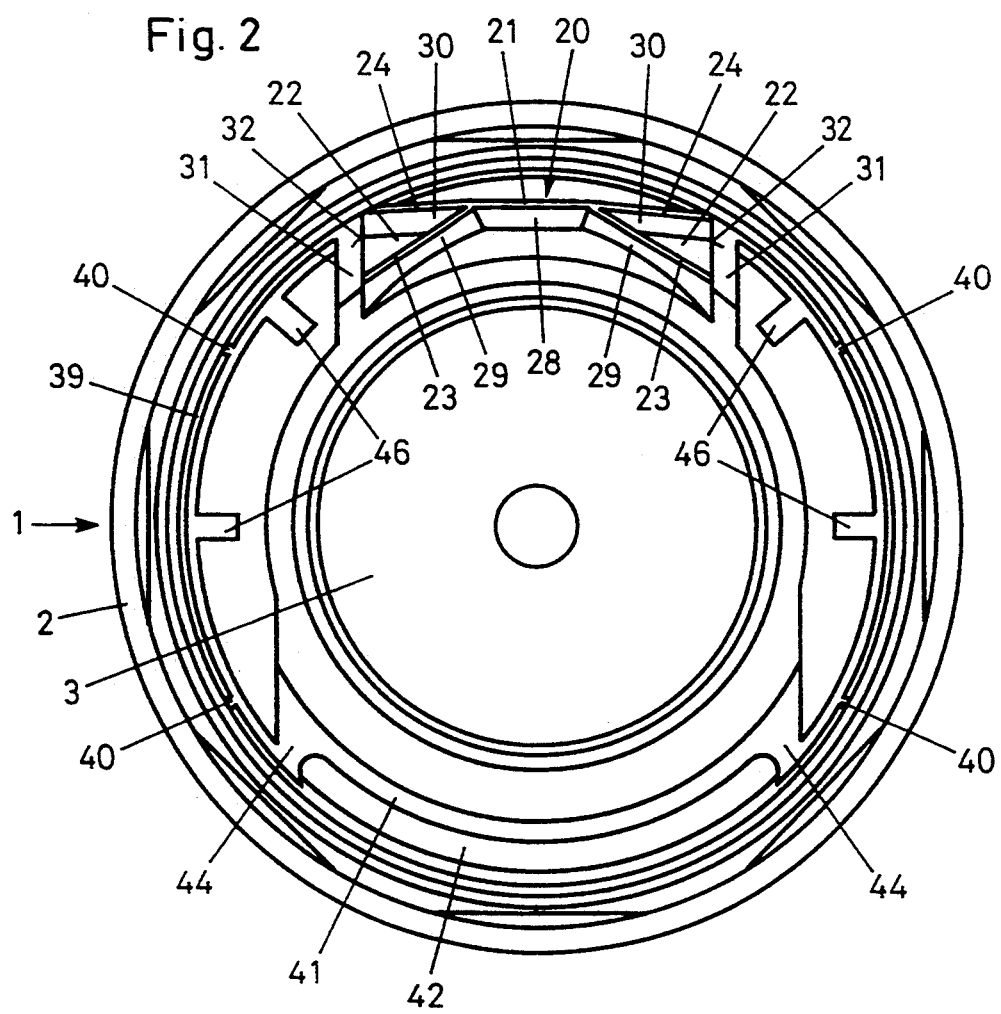

Cap 3 is connected to base portion 2 by a snap hinge 20, as shown in FIG. 2. This consists of a main bending juncture 21, which directly connects cap 3 to base portion 2 and runs vertical to axis 17 and defines the main pivotal axis of closure 1, and two intermediate elements 22 arranged on both sides, that are each connected by two secondary or auxiliary bending junctures 23, 24 to base portion 2 or cap 3. Main bending juncture 21 and secondary bending Junctures 23 and 24 are suitably designed as plastic film snaps and are all preferably straight. In the embodiments presented the intermediate elements 22 are triangular tension elements. Their points are turned against one another and collapse with the ends of main bending juncture 21. In the closed position the surface defined by the secondary bending junctures 23, 24 of the same intermediate element 22 is slanted both toward the main bending juncture 21 and toward axis 17. This enables the sectional view in the area of snap hinge 20 to be formed in such a way that in spite of the appropriate narrow belted thin points for bending junctures 21, 23, 24 the mold part 70 for formation of the interior wall of the die cavity of the injection mold illustrated in FIG. 8 can be opened in the direction of axis 17. Main bending juncture 21 and secondary bending junctures 23, 24 are arranged on an approximately cone-shaped or cylinder-shaped surface, whose generatrix form in conjunction with axis 17 a sharp angle of preferably more than 20°. Flat surfaces 25, 26, 27 (see FIG. 6) connect downward, in the direction of opening, to bending Junctures 21, 23, 24 parallel to the axis 17. In contrast, the connecting surfaces 28, 29, 30 from the opposite side pass almost radial to axis 17. In cap 3 there is one slot 31 at each side of the snap hinge 20. The intermediate elements 22 have a free rim 32 against this slot 31.

The approximately conical outer surface 35 of snap hinge 20 continues in the downward direction beyond slots 31 as a conical end face 36 of base portion 2 and as cone 37 of cap 3. On its periphery extending from slots 31 connecting to cone 37, cap 3 has a cylindrical surface 38 whose diameter is less than the smallest internal diameter of base portion 2. Narrow slot 39 formed from this is bridged at several points by safety tabs 40 extending from the main hinge 21. Diametrically opposite to snap hinge 20, cone 37 of cap 3 terminates into a radial, inwardly displaced cylindrical wall 41, so that a grip attachment 42 is formed thereon. The upper frontal area 43 of base portion 2 and the lower frontal area 44 of the outer area of cap 3 are in a single plane 45.

The lower portion of cone 37 and the cylindrical section 38 of cap 3 are reinforced by several radial ribs 46 (see FIG. 2), which also are connected to frontal area 44. This frontal area 44 reinforces ribs 46 in closed position on a flat frontal area 47 of insert 4 (FIG. 1), in order to transfer the outward forces and loads of cap 3 to insert 5.

As is apparent from FIG. 2 the outer diameter of cap 3 is smaller by twice the width of slot 39 than the smallest internal diameters of base portion 2.

In FIG. 8 a mold part 70 of an injection mold is schematically presented in sectional view. The section provides for a completed mold in the die cavity above the separating plane 45 a wall 71 for formation of the internal contour of cap 3 and below the separating plane 45 a wall 72 for formation of the interior contour of base portion 2. The two walls 71, 72 are coaxial to each other and to axis 17. In the projection parallel to axis 17, wall 71 is located completely within wall 72.

The described closure 1 is well suited for expedient mechanical assembly on bottle neck 6. It is tamper proof, i.e. the final user can immediately determine if closure 1 has been opened after placement on the bottle 7 because then the safety tabs 40 are broken. The safety tabs 40 are broken when the bottle is opened for the first time. This is both visible and audible. For additional opening the tension elements 22 are stressed, and pressure or traction forces that because of the eccentric traction forces lead to an elastic bending of these closure components are transferred to the walls of base portion 2 and cap 3 next to the bending junctures 21, 23, 24. As soon as dead center is exceeded, in which all bending junctures 21, 23, 24 lie in a single plane, the cap snaps into the open position. The described closure 1 is also appropriate when correspondingly adapted for container openings other than round ones, e.g. for oval openings. Given appropriate adaptation of neck 6 of bottle 7 insert 4 can also be dispensed with. Instead of the described snap hinge 20, which presents a particularly aesthetically pleasing solution, other hinge designs can also be used, for example snap hinges for which the secondary hinges are parallel to the main hinge and/or for which the intermediate elements are spiral springs.

Two alternate applications are presented in FIGS. 9 and 10 in which like reference numerals denote like elements of FIGS. 1–8, and in which the snap hinge 20 is constructed on flat surfaces angled towards one another, for example on adjoining surfaces 35a, 35b and 35c of a truncated pyramid. That way the bending junctures 21, 23, 24 can be constructed perfectly straight. As FIG. 10 shows, the slots 31 can also run skewed towards closure axis 17 and the intermediate elements 22 asymmetrically arranged relative to the main axis defined through the main bending juncture 21. In this way the tension of intermediate elements 22 can be reduced for a specified dead-center angle.

The invention having thus been described, it will be apparent to those of skill in the art that the same may be varied in many ways without departing from the spirit of the invention. All such variations are intended to be covered by the following claims.

What is claimed is:

1. A plastic closure for a container, in particular for bottles, comprising:

a base portion to be placed upon a neck of the container and a cover connected by a snap hinge to the base portion;

the snap hinge having a main bending juncture connecting the base portion directly to the cover which defines a main axis of the closure; and an intermediate component on both sides of the main bending juncture, with the intermediate components each connected to the base portion by a first auxiliary bending juncture and to the cover by a second auxiliary bending juncture;

wherein both the main bending juncture and the auxiliary bending junctures, when the closure is in the closed position, are arranged on a substantially cone-shaped surface inclined to a longitudinal axis of the base portion.

2. A plastic closure according to claim 1, wherein said cone-shaped surface has a circular cross section.

3. A plastic closure according to claim 1, wherein the cover has an outer contour that fits completely within an interior contour of the base portion when the closure is in closed position and viewed in a direction along the longitudinal axis of the base portion.

4. A plastic closure according to claim 3, wherein the base portion and the cover are connected to one another by a safety tab in addition to the snap hinge to form an original closure.

5. A plastic closure according to claim 3, wherein both the auxiliary bending junctures and the main bending juncture are approximately in a straight line.

6. A plastic closure according to claim 3, wherein an inner is placed in the base portion for positioning on the container neck against which the cover acts as a seal when in a closed position.

7. A plastic closure according to claim 1, wherein the base portion and the cover are connected to one another by a safety tab in addition to the snap hinge to form an original closure.

8. A plastic closure according to claim 1, wherein both the auxiliary bending junctures and the main bending juncture are approximately in a straight line.

9. A plastic closure according to claim 1 or 8, wherein an inner is placed in the base portion for positioning on the container neck against which the cover acts as a seal when in a closed position.

10. A plastic closure for a container, in particular for bottles, comprising:

a base portion to be placed upon a neck of the container and a cover connected by a snap hinge to the base portion;

the snap hinge having a main bending juncture connecting the base portion directly to the cover which defines a main axis of the closure; and an intermediate component on both sides of the main bending juncture, with the intermediate components each connected to the base portion by a first auxiliary bending juncture and to the cover by a second auxiliary bending juncture;

wherein both the main bending juncture and the auxiliary bending junctures, when the closure is in the closed position, are arranged on a substantially pyramid-shaped surface inclined to a longitudinal axis of the base portion.

11. A plastic closure according to claim 10, wherein the cover has an outer contour that fits completely within an interior contour of the base portion when the closure is in closed position and viewed in a direction along the longitudinal axis of the base portion.

12. A plastic closure according to claim 11, wherein the base portion and the cover are connected to one another by a safety tab in addition to the snap hinge to form an original closure.

13. A plastic closure according to claim 11, wherein both the auxiliary bending junctures and the main bending juncture are approximately in a straight line.

14. A plastic closure according to claim 11, wherein an insert in placed in the base portion for positioning on the container neck against which the cover acts as a seal when in a closed position.

15. A plastic closure according to claim 10, wherein the base portion and the cover are connected to one another by a safety tab in addition to the snap hinge to form an original closure.

16. A plastic closure according to claim 10 or 15, wherein both the auxiliary bending junctures and the main bending juncture are approximately in a straight line.

17. A plastic closure according to claim 10 or 15, wherein an insert is placed in the base portion for positioning on the container neck against which the cover acts as a seal when in a closed position.

* * * * *

UNITED STATES PATENT AND TRADEMARK OFFICE
CERTIFICATE OF CORRECTION

PATENT NO. : 5,335,802
DATED : August 9, 1994
INVENTOR(S) : Ulrich BRACH et al.

It is certified that error appears in the above-identified patent and that said Letters Patent is hereby corrected as shown below:

Col. 2, line 31, "Junctures" should be --junctures--.

Col. 2, line 52, "Junctures" should be --junctures--.

Col. 4, line 32, "inner" should be --insert--.

Col. 4, line 42, "1 or 8" should be --1, 7 or 8--.

Col. 4, line 43, "inner" should be --insert--.

Signed and Sealed this

Twenty-third Day of January, 1996

Attest:

BRUCE LEHMAN

Attesting Officer       Commissioner of Patents and Trademarks